United States Patent Office 3,460,972
Patented Aug. 12, 1969

3,460,972
LIQUID ENCAPSULATION
Herman Nack, Columbus, Ohio, assignor, by mesne assignments, to The Battelle Development Corporation, Columbus, Ohio, a corporation of Delaware
No Drawing. Filed Sept. 29, 1965, Ser. No. 491,413
Int. Cl. B44d 1/14
U.S. Cl. 117—72    9 Claims

ABSTRACT OF THE DISCLOSURE

This invention is a process for making capsules of a liquid core and a case that is substantially impermeable to the liquid that consists of coating a substance that is substantially compatible with the liquid with a continuous film of a material that is substantially insoluble in the liquid but which has a permeability disposed to permit the substance and the liquid to leach therethrough, contacting the coated substance with the liquid so as to leach at least a portion of the material through the porous film, and coating the film with a second material so as to reduce the liquid permeability of capsule wall.

---

This invention relates to improvements in liquid encapsulation and relates in particular to a new and novel method for encapsulating highly permeable liquids.

There is presently considerable industrial demand for means to store minute quantities of liquids in an inactive state for extended periods of time for release when desired. One particularly successful method in meeting this demand has been to encapsulate such liquids with continuous films of materials disposed to retain the liquid. When a release is desired, such capsules are purposely ruptured. For example, United States reissued Patent 24,899, Green, describes a method for making oil-containing microscopic capsules that have a gelled-hydrophilic colloid capsule wall. These capsules are spread onto the surface of paper manifolds in close proximity to materials disposed to react with the encapsulating oil to produce color. The application of localized pressures effects rupture of the capsule walls to release the oily substance to cause the desired color-forming reaction.

All known encapsulating materials when applied as cell-wall materials for liquid core capsules exhibit a degree of liquid permeability. Such permeability or penetration of the cell wall by the liquid is variously attributable to porosity of the wall, molecules of the liquid passing through the interstices between the molecules of the encapsulating material and solution of the liquid core in the cell-wall material. Porosity, of course, may consist of pin holes or natural openings and irregularities in the cell wall. Where the core liquid is soluble to some extent in the cell-wall material, it may be transferred from the solution to the cell wall and from the cell wall to adjacent materials for which it has an even greater affinity.

Prerequisites for liquid encapsulating cell walls are: (1) they must possess sufficient strength to withstand the normal manufacturing, handling, and shipping conditions encountered by the product for which they are intended; (2) they must not be so strong that they will not rupture at reasonable pressures at the time of their utilization; and (3) at their optimum thicknesses for meeting (1) and (2) above, they must not be so porous and permeable that the liquid permeates the cell wall prematurely. Where the core is an organic liquid composed of relatively large and complex molecules, the permeability of the capsule wall is not a critical problem and may be readily overcome since many known cell-wall materials possess adequate resistance to penetration by the large and complex organic molecules of the relatively viscous liquids. For example, the hydrophilic colloid materials of the aforementioned Green patent satisfactorily retains the heavy oil substances to which the Green process applies while providing the needed strength for handling but which are readily ruptured in their disclosed utilization. However, it is more difficult to retain less viscous liquids having smaller and less complex molecular structures as encapsulated since they readily permeate through the capsule walls. Low molecular weight liquids are accordingly far more difficult to encapsulate or maintain as encapsulated than high molecular weight liquids. Polar liquids such as water or ammonia are particularly difficult to retain within a capsular wall since few encapsulating materials employed within practical thickness ranges will retain these liquids for practical periods of time.

Additionally even high molecular weight and viscous liquids may be difficult to encapsulate where such liquid core is substantially soluble in the capsule wall material. For example, toluene is difficult to encapsulate because of its high solubility in many encapsulating materials.

For any given application, a balanced relationship between capsule wall strength and capsule wall permeability must be reached. If a polymer capsule wall is utilized which is of a thickness required to retain a given low viscosity liquid for a desired period of time, it may be too resistant to rupture at reasonable pressures for practical applications. Yet, if the wall strength or thickness is reduced to a point where the strength may be sufficient for handling but low enough for appropriate rupture the permeability of the cell wall increases and contributes to premature leaching of the liquid core.

For example, it is well known that moist cigarette filters are far more efficient in removing tars and other deleterious substances from cigarette smoke than dry filters. Heretofore no effective means have been known to conveniently provide such moisture. If such filters are moistened prior to packaging and shipping, such moisture is lost prior to use. The present invention provides a means whereby water may be successfully encapsulated and the capsules incorporated into cigarette filters so that the desired moisture may be provided by compressing such filters to rupture the capsule walls. Such capsules are capable of retaining their water content for extended periods of time and possess the requisite strength properties for handling.

The present invention is a method for encapsulating liquids whereby for any given cell wall thickness the permeability of any liquid core capsule wall may be effectively reduced.

It is, therefore, the object of the present invention to provide a means for encapsulating liquids whereby for any given strength capsule wall the permeability resistance of said wall to the liquid is enhanced.

It is also the object of the present invention to provide an improved means for encapsulating liquids whereby the resultant capsules exhibit improved resistance to permeability.

Another object of the present invention is to provide a means for encapsulating liquids whereby highly permeable liquids such as polar liquids are readily encapsulated and the capsule walls for any given strength will exhibit improved resistance to penetration by such liquids.

A further object of the present invention is to provide a means for encapsulating water or aqueous solutions whereby the capsule walls possess enhanced resistance to penetration for any given thickness or strength.

A still further object of the present invention is to provide an article of manufacture consisting of a cigarette having a filter containing a plurality of water-filled capsules, the cell walls of which possess the requisite strength for normal manufacturing, shipping, etc. without rupture but which will rupture when manually compressed to burst and release such water and moisten the filter and such walls having permeability resistance to such water to enable the capsules to retain the water for the normal times necessary to market and distribute such product.

Other objects and advantageous features of the present invention will be obvious from the following description and examples.

In general, the present invention relates to the encapsulation of liquids with encapsulating walls of selected thickness from materials that are normally permeable by such liquid by: (1) providing capsules having cell walls that are thinner than such thickness and which have core materials that are soluble or miscible in such liquids and which are capable of permeating the capsule walls when in solution or mixed with such liquids; (2) leaching the core material from the capsules with the liquid to leave capsules of the liquid; and (3) coating these capsules to the selected thickness.

A preferred embodiment of this invention relates to the encapsulation of water or aqueous solutions with polymers of preselected thickness whereby relatively thin walled polymer capsules containing water-soluble or miscible core materials that will penetrate or permeate through the thin polymer walls are leached with water or an aqueous solution to provide water or aqueous solution filled capsules and recoating these capsules with a polymer to the preselected thickness so as to reduce the permeability for such given thickness polymer walls. Such capsules are found to have enhanced resistance to penetration by the liquid core.

Another preferred variation of the method of the present invention is to provide a wax coating or barrier to the relatively thin walled water or aqueous solution filled capsules prior to recoating to the desired thickness.

A further preferred variation in the method of the present invention is the polymer coating of water soluble solids in a fluidized bed. Such means provides a particularly desirable even coating which may be cured in the bed.

A still further preferred embodiment of the present invention is the encapsulation of water-filled capsules made in accordance with the aforementioned means in cigarette filers.

As stated above, methods for encapsulating liquids are known. One example (recited above) is a method for making microcapsules as taught by U.S. Patent Re. 24,899, B. K. Green. In accordance with the method of this patent an oily substance is dispersed in an aqueous solution of gelable hydrophilic colloid materials. The hydrophilic colloid materials are caused to coagulate through a process known as coacervation and form a solid wall of the hydrophilic colloid material around each emulsified oily droplet. The thus formed capsules are then dried. The permeability of the cell walls is controllable to some extent. If gelation is performed rapidly, small pores are formed and if formed slowly, large pores are said to result. The porosity and/or permeability of such coatings is dependent on whether a slow release of the oily core is desirable or if the cell walls are to contain fluid for rupture. British Patent 949,910 relates to a process for replacing the oily nucleous materials of capsules obtained by the coacervation process of Green with liquid, water-miscible materials. The gelled capsules are said to be in a swollen state due to absorbed water and while in said state they are immersed in a liquid exchange vehicle which is miscible in water and a solvent for the capsule contents. The vehicle passes through the walls to dissolve the oily content which diffuses out through the capsule walls. The capsules are then contacted within an anhydrous wall absorbing bath which extracts the water of the shell to render them less permeable. The hydrophilic colloid process is particularly effective for encapsulating and retaining the relatively heavy (large molecule) non-soluble oily substances in microcapsules, however, the porosity or permeability of the capsule walls at best do not prevent an undesirable premature release of less viscous liquids including water.

There are many applications wherein it is desirable to encapsulate water or aqueous solutions wherein the capsules will retain the water until such time as when the water is needed, whereupon the capsules are ruptured. In these instances a capsule is needed that will possess the strength properties needed for manufacture and handling but which will rupture on compression above such required strength levels to release the water. The prior known encapsulating means frequently fail to meet these demands.

One application of such water-filled capsules is their incorporation into a water soluble glue which is applied to a fibrous backing such as paper tape. When the tape is applied, as in packaging, etc., it is pressed against the surface of the package with sufficient force to rupture the capsules and provide the necessary water to solubilize the glue to the extent necessary for utilizing its adhesive properties. A second example, mentioned above, is a need for moisture in a cigarette filter prior to smoking. Water-filled capsules are incorporated in the filter during manufacture and are ruptured just prior to use by compressing the filter. Although the microcapsules of the Green process are generally too small for these specific applications, adaptation of the hydrophilic colloid system as taught by British Patent 949,910 for such applications does not result in a satisfactorily encapsulated product because the capsule wall does not retain a low viscosity liquid such as water over the required period of time.

Methods for encapsulating aqueous solutions with polymeric materials are taught by U.S. Patent 3,173,878 and British Patent 950,443. Continuous polymer films offer advantageous strength properties over hydrophilic colloids. However, relatively few polymers have good resistance to the transmission of water or water vapor. The following films have been found to have low moisture permeability: vinylidene chloride copolymers with vinyl chloride, acrylonitrile and isobutylene; polyethylene, fluorinated ethylene polymers, polyisobutylene, butyl rubber, and rubber hydrochloride.

Even where such polymers have substantial resistance to water peneration their permeability is such as to inhibit their use in many applications where water retention must be for extended periods of time unless employed at prohibitive thicknesses. For example, to encapsulate water for use in cigarette filters with the vinylidene copolymer while providing a cell wall that will satisfactorily retain the water, it is necessary to effect a cell wall thickness that renders it difficult to rupture by mere compression of the filter. When this copolymer is applied at thicknesses where it may be conveniently ruptured by compression of the filter, the water core leaches from the capsule prematurely leaving a dry cigarette filter containing empty capsule shells. By applying the present method capsules having cell walls of the desired handling strength but which will rupture satisfactorily upon appropriate compression exhibit satisfactory resistance to water penetration.

In a preferred embodiment of the present invention wherein polymer coatings are utilized as cell walls, low viscosity liquids such as water which are particularly difficult to retain may be successfully encapsulated where a liquidphobic (hydrophobic in the case of water) coating is interposed between polymer coatings of the cell wall. Such liquid phobic coating need not contribute to the strength properties of the cell wall but preferably is continuous and of a wax-like viscosity that will penetrate and seal any porous condition of the polymer walls while acting as a water or liquid barrier. For example, where encapsulating water with a polymer a continuous coating of wax interposed between the inner and outer polymer films materially reduces water penetration of the capsule wall. For the purposes of the present specification the term "wax" will include all organic long chain hydrophobic substances that fall generally under the term "wax." For example, the wax may be a petroleum wax, beeswax, etc.

We have found that by far the preferred method for making water polymer capsules is by means of the fluid-bed process. Spheroidal water soluble solids such as urea or sugar prills are readily available and may be easily fluidized. The spray coatings obtained by such means are uniform and the thickness of such coatings may be readily controlled. By these means the water soluble solid may be coated by a relatively water resistant plastic to a weight corresponding to a minimum thickness that is sufficiently permeable to permit easy water penetration to solubilize the core and for leaching the core material from the capsule within practical times for commercial utilization. The top coat may be applied in a similar manner to produce the desired wall thickness at reduced permeability.

Many batches of water-filled capsules were made for incorporation in cigarette filters in the following manner:

The initial step in the manufacture of these capsules was the fluidization of urea prills (approximately 8 mesh) in a fluid-bed apparatus. A copolymer of vinylidene chloride plus vinyl chloride was sprayed into the bed in the form of a commercially available emulsion of such copolymer known by the trade name Daran (made by the Dewey and Almy Chemical Division of W. R. Grace & Company). Since urea is water soluble, it was found that some of the urea dissolved in the aqueous base prior to drying or curing of the polymer. This resulted in undesirably distorted shaped capsules so that it was necessary to apply a prepolymer primer coating to the surface of the prills to protect the urea from dissolution in the water of the emulsion prior to drying. Such primer coat was effected by spraying a brittle hydrocarbon resin solution known commercially by the trade name Picoflex (copolymer of styrene and acrylonitrile plus plasticizer as manufactured by the Pennsylvania Industrial Chemical Corporation). Fluidization was continued for about 15 to 20 minutes at the conclusion of spraying at ambient temperatures to allow the thin primer coating to dry.

At the conclusion of the primer coat an aqueous emulsion of the vinylidene chloride-vinyl chloride copolymer was sprayed into the fluidized bed of Picoflex coated urea prills. At the conclusion of spraying the temperature of the fluidized bed was raised (to about 150–160° F.) to cure the copolymer coating. Upon reaching temperature the bed was allowed to cool to ambient temperatures by immediate spraying with the second coating of the copolymer emulsion. The temperature of the bed was again raised to cure the second coat.

The utilization of two thin polymer coatings rather than one was for the effective use of the fluidized-bed—spray-coating process. The thermodynamics of this process are such that the two coats are often more rapidly and efficiently applied than one coat of corresponding thickness.

The initial copolymer coatings were applied to a total weight corresponding to thicknesses of less than one-half of that required for the ultimate wall strength. Actual wall thicknesses were not determined, however, the process of spray coatings spheroidal particles in a fluidized bed effects highly uniform coating thicknesses so that the weight of spray material employed for a given weight of fluidized particles is an accurate determination of relative cell wall thickness and strength. In the present instance, a cell wall thickness acquired when the Daran polymer emulsion was sprayed in quantities equivalent to 20 to 25 percent of the weight of the fluidized urea prills was regarded as adequate for providing the requisite cell wall rupture resistance. The initial two coatings were applied to a total combined weight corresponding to from about 8 to 10 percent of the weight of the urea prills. Thus the thickness of the original two coatings was less than half of that required for desired predetermined strength properties. The Picoflex, though applied to a weight of from 8 to 22 percent of the bed is a brittle and porous coating that does not contribute materially to the vapor barrier or wall strength properties of the capsules.

The coated urea prills were removed from the fluidized bed and screened on a vibrating screen to eliminate agglomeration. They were then immersed in running water at ambient temperatures for periods of up to 48 hours during which period of time water penetrated the thin polymer coatings to dissolve the urea cores and the urea leached through the capsule walls leaving a substantially water encapsulated product.

The water capsules were now removed from the leach tank, dried and fed to a wax coater where they are coated with a petroleum wax. The petroleum wax offered no significant contribution to the strength of the capsule walls but effectively sealed the pores of the polymer capsule walls. Additionally, such continuous wax coat provided a hydrophobic barrier to water which penetrates the inner capsule walls. The weight of application of such wax coating is not critical and any continuous coating serves to materially reduce the water permeability of the capsule wall. We have had particular success utilizing about a 20 percent by weight petroleum wax coating.

After appropriate screening and drying the Daran coated water capsules were again fluidized and again spray coated with about 15 percent, by weight, of the vinylidene-chloride-vinyl-chloride copolymer emulsion. The temperature of the bed was raised to about 120° F. for a period of about one-half hour to effect curing.

After cooling and sifting, the capsules were prepared for utilization in cigarette filters. The final wall of thickness as determined by weight applications of the Daran coating ranged from about 20 to 30 percent of the weight of the original fluidized bed of urea prills. This weight of coating or cell wall thickness is that which has been found to have desired rupture resistance strength best calculated to withstand normal handling during shipping, incorporation into the filters, and the varying handling, packing, shipping, and storage environments to which the assembled cigarettes are subjected but were subsequently easily ruptured by compression of the filter.

The above-described process illustrates generally the mode of manufacture utilized to make water-filled capsules for cigarette filters. Such mode of manufacture has been utilized in the manufacture of numerous batches of such capsules while varying the exact parameter of time, temperature, etc. The following data illustrates more specifically the manufacture of particularly successful batches of the encapsulated product.

Forty pounds of 8 mesh (approximately .093" diameter) speroidal urea prills were fluidized in an 18-inch diameter fluid-bed chamber. The fluid-bed apparatus was provided with a spray nozzle positioned substantially dead-center of the fluidized bed and 18-inches above the 6-inch stagnant bed level of the urea prills. Appropriate conduits provided liquid spray solutions and atomizing gas (about 35 pounds pressure) to the nozzle. The fluidizing gas was an air flow from a source of about 45 pounds pressure.

A 44 pound solution consisting of about 8 pounds of Picoflex stock solution; 30 pounds of methylene chloride, and 3 pounds of acetone sprayed into the fluidized bed of urea prills at ambient tempeartures. This solution amounting to about 10 percent, by weight, polymer was pumped to the nozzle at a rotometer setting that ranged from 0.075 to 0.15. After about one hour and forty-five minutes, Picoflex spraying was discontinued. Approximately 44 pounds of the Picoflex solution had been sprayed onto the bed. The bed fluidizing air flow was cut to about 33 pounds but the bed was maintained at ambient temperatures for about 15 minutes to permit the polymer coating to dry. The fluidizing air flow was then increased to about 45 pounds and approximately 4 pounds of commercially available Daran was pumped to the nozzle and sprayed onto the fluidized bed. Spraying was completed in about 6 minutes at which time the fluidizing air pressure was again reduced to about 33 pounds. At this time, electric heaters used to heat the fluidizing gases were turned on. These heaters were turned off when the bed reached the tempearture of about 150° F. at which time the fluidizing flow was increased to 45 pounds and an additional 4 pounds of Daran was sprayed into the bed. At the conclusion of this spraying (about 6 minutes) the heaters were again turned on and the fluidizing gas flow was reduced to about 29 pounds. When the bed temperature reached 175° F. the heaters were turned off and the bed was allowed to cool.

The fluidizing gases were turned off when the bed reached ambient temperatures and approximately 47 pounds of about 6 mesh coated urea prills were removed. The total coating weight amounted to approximately 17.50 percent, by weight, of which about 4.4 percent was Picoflex.

Polymer coated urea prills manufactured in the manner described above were screened to eliminate agglomeration and immersed in leach tanks at ambient temperatures. Such leach tanks consisted of galvanized containers each containing about 15 gallons of water at ambient temperatures. The water flowed into each tank from a bottom inlet and out through a top port at a rate of about 150 milliliters per minute. Approximately 30 pounds of the coated prills were introduced into each tank where they remained for a period of about 48 hours. At the conclusion of this leaching period the now water-containing capsules were screened and dried in an air dryer at room temperature (a pseudo fluid bed, when fluidizing begins the capsules are considered to be dry).

Water-filled capsules prepared in the above-described manner were drained, dried, and wax coated in a Stokes pan coater. The pan coater was a substantially vertically positioned rotatable drum heated by using a bank of 20 (250 and 375 watts) lamps arranged around the outside of the drum and five on the inside. After heating the drum to above the melting point of paraffin wax, the five internal lamps were removed and a 30 pound lot of capsules to be coated were introduced into the coater. Next approximately 9½ pounds (about 30 percent, by weight of the capsules) of a wax-dye-castor oil mixture (187½ pounds of paraffin wax, 56¼ grams of Du Pont Royal Blue A Dye and 7½ pounds of castor oil) was poured over the capsules. After about 30 seconds the 20 outside lamps were turned off and a water-air spray was used to cool the coated capsules, the spray gun having fine and coarse settings. The capsules were sprayed for 5 minutes with a fine setting and then with the coarse setting until the agglomeration of the capsules stopped indicating that the coating had solidified. During the spray operation capsules adhering to the side of the coater were broken loose with a hard scraping tool. When the capsules were sufficiently cool, that they no longer tended to agglomerate, the pan coater was stopped and the capsules removed. Upon removal, they were again screened to remove water and reduce agglomeration.

Twenty-five pound lots of polymer and wax water-filled capsules were introduced into a 12-inch fluidized-bed apparatus. They were fluidized as before, with a fluidizing air gas flow rate of about 35 to 45 pounds. The fluidizing gas heaters were again turned on and when the temperature of the bed reached about 90° F., the bed was sprayed with approximately 6 pounds 4 ounces of Daran emulsion. The temperature of the fluidized bed was then allowed to reach about 120° F. and maintained at this temperature for a period of about 30 minutes to cure the resin coat. At the conclusion of curing the bed was allowed to cool and the capsules were screened through a 6 mesh screen. These capsules were then packed in containers (15 pounds per container) shipped to a cigarette manufacturer and incorporated into cigarette filters. The capsules readily ruptured upon compression of the filters to release water and provide moisture but did not release water prematurely.

In a preferred embodiment of the process of the present invention, a liquid soluble solid core is solubilized and leached from the relatively thin-walled capsule to leave a liquid core or a liquid core may be leached from a capsule by a second liquid that is miscible with such liquid core (as in the manner of British Patent 949,910). For purposes of the present claims the word "compatible" as used in conjunction with such capsular core materials and the leaching fluid shall encompass both soluble solid substances and miscible liquids.

It will be understood that the size or diameter of the capsules are not critical factors in the method of the present invention. However, such sizes will generally range from several (about 2) millimicrons to several (about 2) thousand microns.

Where the word polymer is used in the present claims, it includes rubbers, resins, and plastics composed of polymerized materials and also encompasses such materials that are composed of copolymers.

What is claimed is:

1. A process for making aqueous liquid core capsules of predetermined wall strength characterized by high permeability resistance to said liquid comprising:
   (a) coating a water soluble substance with at least one continuous film of a material that is substantially insoluble in said liquid, said at least one continuous film being applied to a thickness disposed to afford less than said predetermined strength and said at least one continuous film having a permeability at said thickness disposed to permit said substance and liquid to leach therethrough;
   (b) contacting said coated substance with said liquid so as to leach at least a portion of said substance through said at least one continuous film so as to form a liquid filled capsule; and
   (c) coating said at least one film with at least one additional film of a material disposed to reduce the permeability of the capsule wall, said at least one additional film being applied to a thickness disposed to afford a total capsule wall of substantially said predetermined strength.

2. The process of claim 1 wherein said at least one continuous film is a polymer and at least one of said at least one additional films is composed of a wax.

3. A process for making capsules of a water-base liquid core and a water-insoluble case of high water permeability resistance having a substantially predetermined strength comprising:
   (a) coating a water soluble solid substance that is substantially compatible with said water-base liquid with at least one continuous film of a water-insoluble polymer, said at least one continuous film being applied to a thickness disposed to afford less than said predetermined strength and said at least one continuous film having a permeability disposed to permit said water-base liquid and said substance to leach therethrough;
   (b) contacting said coated substance with a water-base liquid so as to leach out at least a portion of said substance through said at least one continuous film to form a liquid filled capsule;
   (c) coating siad at least one film with a substantially hydrophobic wax disposed to reduce the porosity and permeability of said at least one continuous film;
   (d) coating said wax coating with at least one additional film of a water insoluble polymer, said at least one additional film being applied to a thickness disposed to afford a total capsule wall of substantially said predetermined strength.

4. The process of claim 3 wherein said substance is a water soluble particulate solid and said at least one film and said at least one additional film is applied by fluidizing said particulate solid and spray coating said fluidized particulate solid with said polymer.

5. The process of claim 3 wherein said substance is particulate urea.

6. A process for making capsules of a water core and a substantially water impermeable case having a substantially predetermined strength comprising:
  (a) fluidizing particulate water soluble solids;
  (b) spray coating said fluidized particulate solids with at least one continuous film of a water insoluble polymer to a thickness which when cured is disposed to afford less than said predetermined strength and have a permeability that will permit water and said solids to leach therethrough;
  (c) curing said at least one film;
  (d) contacting said coated solids with water so as to solubilize and leach out at least a portion of said solids through said at least one continuous film thereby forming water-filled capsules;
  (e) coating said capsules with a substantially hydrophobic wax disposed to increase the water impermeability of the walls of said capsules;
  (f) fluidizing said capsules;
  (g) spray coating said fluidized capsules with at least one additional continuous film of a water insoluble polymer to a thickness disposed to afford a total capsule wall of substantially said predetermined strength.

7. The process of claim 6 wherein said solids are composed of urea and said polymers consists of copolymers of vinylidene chloride and vinyl chloride.

8. The method of claim 6 wherein the first of said at least one continuous film is sprayed onto said particulate solids in the form of an aqueous emulsion and said particles are coated prior to this coating with a thin water insoluble film disposed to avoid dissolving said particles with the aqueous portions of said emulsion.

9. The method of claim 8 wherein said solid particles are fluidized and said thin water insoluble film is spray coated onto said particles.

References Cited

UNITED STATES PATENTS

| | | |
|---|---|---|
| Re. 24,899 | 11/1960 | Green. |
| 3,080,250 | 3/1963 | Claus _____ 117—100 X |
| 3,158,462 | 11/1964 | Wilson _____ 117—100 X |
| 3,159,874 | 12/1964 | Langer et al. _____ 117—100 X |
| 3,173,878 | 3/1965 | Reyes. |
| 3,202,533 | 8/1965 | Sachsel et al. _____ 117—72 |
| 3,265,644 | 8/1966 | Herman et al. _____ 117—100 X |
| 3,306,730 | 2/1967 | Malmberg et al. ___ 117—100 X |

FOREIGN PATENTS

| | | |
|---|---|---|
| 927,157 | 5/1963 | Great Britain. |
| 949,910 | 2/1964 | Great Britain. |
| 950,443 | 2/1964 | Great Britain. |

WILLIAM D. MARTIN, Primary Examiner

M. R. P. PERRONE, Jr., Assistant Examiner

U.S. Cl. X.R.

117—92, 100; 131—10; 252—316; 264—4